United States Patent Office 3,392,683
Patented July 16, 1968

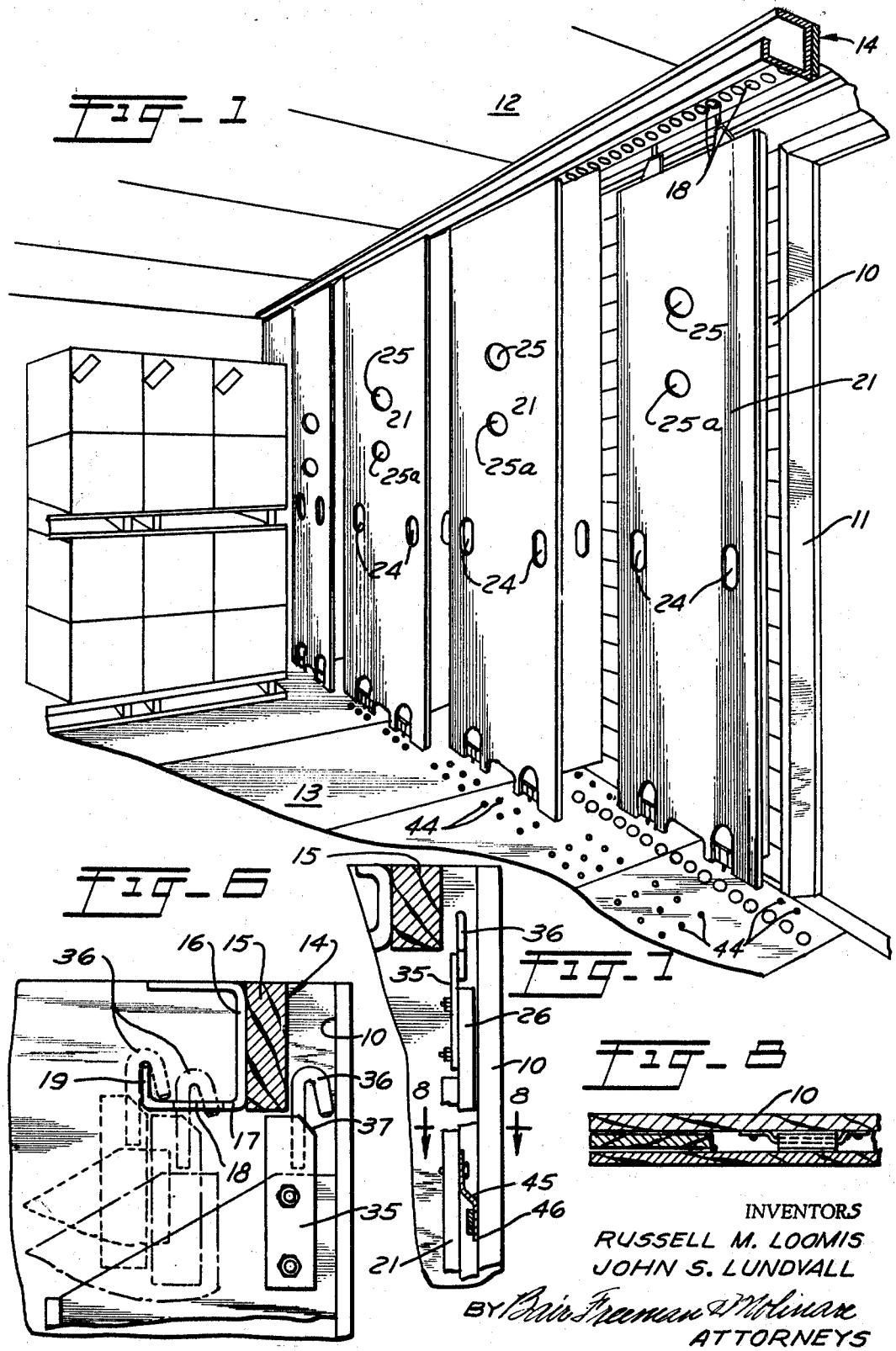

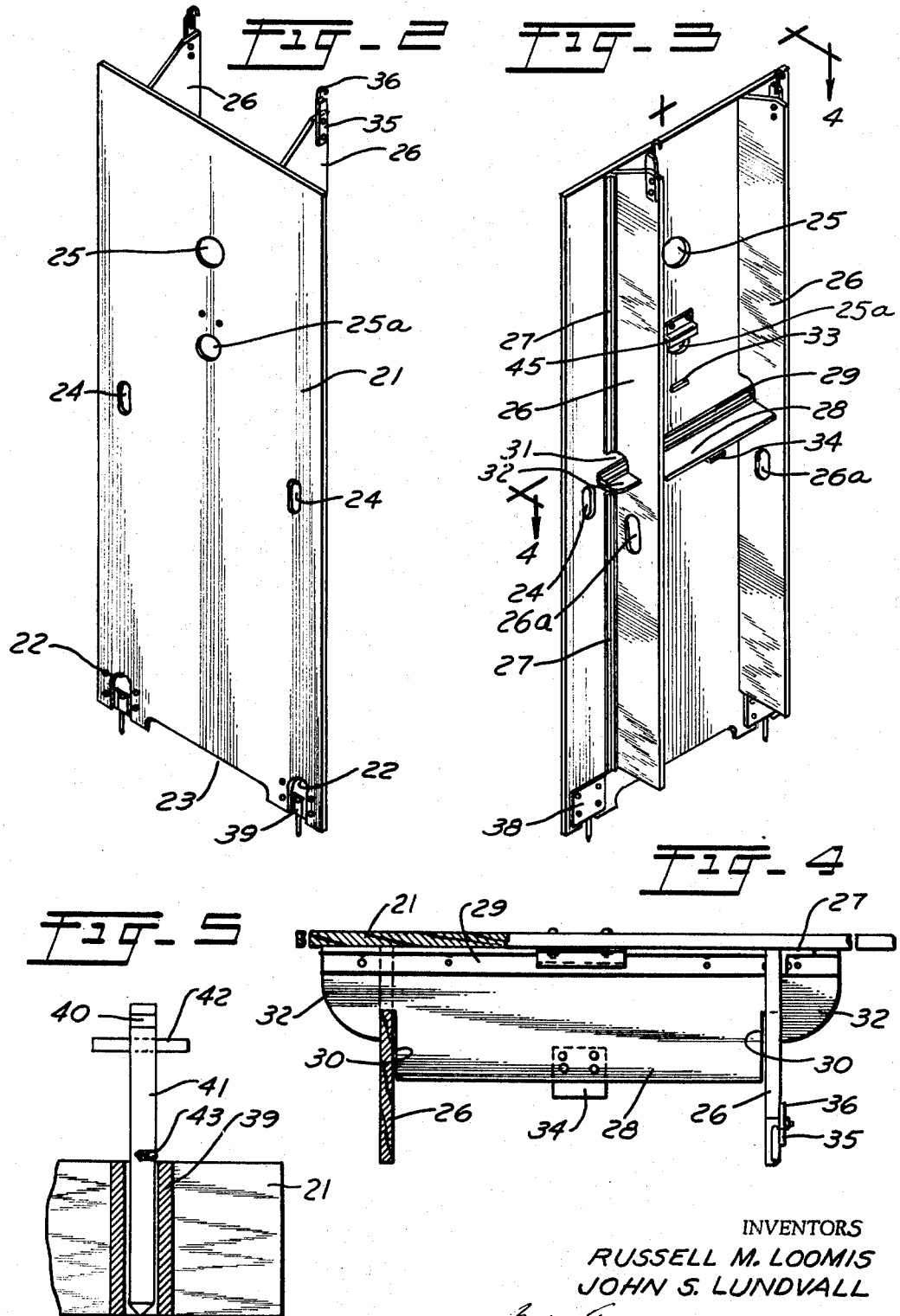

3,392,683
SIDE FILLER FOR RAILWAY CARS
Russell M. Loomis, Palos Heights, and John S. Lundvall, Park Ridge, Ill., assignors to Unarco Industries, Inc., a corporation of Illinois
Filed Nov. 13, 1962, Ser. No. 237,075
13 Claims. (Cl. 105—369)

This invention relates to a side filler for railway cars and more particularly to a panel structure mounted adjacent to the side wall of a standard railway car and adjustable to different spaced positions to vary the effective width of the car.

In shipping various types of goods and particularly packaged or palletized goods of various types, it becomes necessary to provide side support in the car fitting closely adjacent to the goods to prevent lateral shifting thereof with resultant damage thereto during operation of the car. For handling goods of different types or which are packaged in different sized cartons, it is necessary to be able to adjust the side filler to different positions in the car. It is also necessary in all cases to be able to store the side filler in the car so as to minimize interference with normal use thereof. Side fillers as heretofore known have not satisfied all of these requirements or have been relatively complicated and expensive to construct and install.

It is one of the objects of the present invention to provide a side filler which is extremely simple and inexpensive to manufacture, which is easily installed and adjusted to different positions in a car and which can be stored in a minimum amount of space adjacent a wall of the car when it is not in use.

Another object is to provide a side filler which is formed of a simple panel of plywood, or like material, with reinforcing strips hinged thereto and which can be installed in different positions in the car by cooperation of mounting members on the tops of the reinforcing strips with a track structure in the car and by cooperating latching means on the bottom of the panel and on the floor of the car.

According to a feature of the invention, the mounting members are hooks which can fit into the space between the track structure and side wall of the car for storage and for one adjusted position, which can fit into latching openings in the tracks for a second adjusted position and which hook over the inner edge of the track for a third adjusted position. The latching means at the bottom preferably comprises latching pins slidable vertically in latching sleeves carried by the panel into openings in the floor of the car and with spring detents carried by the pins and frictionally engaging the sleeves tending to hold the pins in any position to which they are moved.

The reinforcing strips are preferably held in extended operative position by a hinge latch plate and the panel is formed with hand holes therein through which the reinforcing strips and latching plates can be moved from the inner side of the panel so that the entire operation of installing, adjusting and removing the side filler can be performed from the inner side of the panel inside of the car.

The above and other objects and features of the invention will be more readily apparent from the following description when read in connection with the accompanying drawings, in which:

FIG. 1 is a partially perspective view of a typical railway car equipped with a side filler embodying the invention and showing the track in section and the side filler in several adjusted positions;

FIG. 2 is a perspective view of the side filler looking from the inside thereof;

FIG. 3 is a similar perspective view looking from the outside of the side filler;

FIG. 4 is a top plan view with parts in section taken on the broken line 4—4 of FIG. 3;

FIG. 5 is a detail sectional view of the bottom latch;

FIG. 6 is a detail sectional view showing the several different adjusted positions of the side filler at the top end thereof;

FIG. 7 is a partial sectional view showing the stored position of the side filler; and FIG. 8 is a partial section on the line 8—8 of FIG. 7.

The side filler of the present invention is adapted to be installed in a conventional railway freight car, as partially shown in FIG. 1, which has a side wall 10 formed with a door opening framed by a frame 11, a ceiling or roof 12 and a floor 13. It will be understood that the complete car includes two spaced side walls and two spaced end walls which together with the roof and floor enclose a complete lading space.

The car, as shown, is provided with a track structure, indicated generally at 14, and which is best seen in FIG. 6. The track structure, as shown, is mounted adjacent to the juncture of the roof and side wall of the car and comprises a backing strip 15 spaced from the adjacent side wall 10 of the car and a channel shaped strip 16 secured to the roof of the car and to the backing strip, as shown. The channel shaped strip 16 opens toward the interior of the car and has a flat lower horizontal flange 17 formed with a series of spaced latching openings 18 adapted to receive latching pins on lading separating doors. The lading separating doors, not shown herein, may be of the type more particularly described and claimed in the patent to Loomis, et al. No. 3,018,741 and include a supporting beam slidable on an upturned flange 19 at the inner lower edge of the track structure.

The side filler of the present invention, as best seen in FIGS. 2 to 5, comprises an outer panel 21 which may be of plywood or other suitable sheet material having a height slightly less than the full interior height of the car and a convenient width. Plywood panels nine feet by any desired width are suitable for this purpose. It wil be understood that each car may be provided with a sufficient number of side fillers to cover one complete side wall of the car so that the effective width of the car may be adjusted throughout its full length. The panel is preferably cut out at its bottom, as shown at 22, to provide space for mounting bottom latch units and may further be cut out between the latch units, as shown at 23, for toe clearance with the floor of the car. Hand holes 24 are formed in the panel intermediate its height by means of which it can easily be handled and moved from place to place and through which an operator can extend his hands to manipulate the reinforcing strips and latch plate, as described hereinafter. Sighting holes 25 and 25a may be provided in the upper part of the panel through which the operator may look to assist him in positioning the locating and storing hooks, as described hereinafter.

The panel is reinforced and strengthened by vertical reinforcing strips 26 hinged to its outer surface and extending substantially the full height of the panel, as shown. Preferably the reinforcing strips are formed of a material similar to that of the panel, such as plywood strips, and are connected to the panel by continuous elongated hinges 27, such as piano hinges. Hand holes 26a may be formed in the strip 26 to facilitate manipulation thereof.

In order to hold the reinforcing strips in their extended operating position, as shown in the drawings, a latch plate 28 is provided hinged to the outer surface of the panel by a horizontal hinge 29 intermediate the height of the panel and adjacent to the level of the hand holes 24. The latching plate is provided with notches 30 in its free edge and the reinforcing strips 26 are formed with openings 31 therein in which the latching plate may swing from a latched to a released position. The end portions of the latching strip, as shown at 32, are reduced in size to fit into the openings 31 in the reinforcing strips so that when the latching plate is raised to a position flat against the outer surface of the panel the reinforcing strips can swing to a stored position flat against the outer surface of the panel with the end portions 32 of the latching plate lying in the openings 31. Thus in the folded stored position the thickness of the complete side filler unit is equal to only twice the thickness of the panel, which may be on the order of 1 to 1¼ inches. The latching plate is preferably held in its raised stored position by a magnetic catch, including a magnet 33 secured to the back of the panel and cooperating with an iron keeper 34 secured to the edge of the latching plate.

The upper edges of the reinforcing strips 26 carry hook members which are adapted to cooperate with the track structure to hold the upper end of the side filler in different spaced positions relative to the adjacent side wall. Each of the hook members, as best seen in FIG. 6, comprises a flat metal plate 35 bolted or otherwise rigidly secured to the adjacent reinforcing strip 26 and projecting above the top of the reinforcing strip. The plate 35 has secured thereto, as by welding, a metal hook 36 opening downwardly. The plate 35 is wider than the shank of the hook to provide a shoulder portion 37 below the opening of the hook to cooperate with the track in the different adjusted positions to prevent raising of the side filler and accidental disengagement from the track or floor latches and also to prevent tilting of the panel lengthwise of the car.

At the bottom the panel 21 carries latch members, including metal plates 38 secured over the openings 22 in the panel and having formed thereon vertically extending sleeves 39, as shown in FIG. 5. Each of the sleeves receives a vertically slidable pin 41 which is preferably provided with a cross bar 42 at its upper end through which it may be engaged by hand and raised to the release position shown in FIG. 5. The top of each pin 41 is formed with a notch 40 so positioned that it can easily be engaged by the toe of the operator's shoe to raise the latching pin 41 or to depress the latching pin to its latching position. The latching pin is preferably yieldingly held in its raised position by a spring detent 43 carried by the latching pin and engageable with the sleeve 39 so that it will not accidentally drop to latching position. When the pin is moved downward to latching position, the detent will frictionally hold it in such position that it will not accidentally be disengaged due to vibration or bouncing of the car.

The latching pins 41 of the several side filler uits are adapted to be selectively engaged in spaced openings 44 formed in the floor of the car. As seen in FIG. 1, these openings are in rows extending longitudinally of the car and spaced different distances from the adjacent side wall so that the side fillers can be mounted in any one of a large number of different positions both longitudinally and laterally of the car.

The side filler is shown in its stored position at the extreme right of FIG. 1 and in FIGS. 7 and 8. In this position, the reinforcing strips and latch plate are folded flat against the outer surface of the panel 21 and the hook members 36 extend loosely into the space between the track backing strip 15 and the adjacent side wall 10 of the car. The latching pins at the lower edge of the panel are engaged in latching openings 44 lying closely adjacent to the car side wall, although latching at the bottom of the panel is not required in the stored position.

In order to hold the side filler in a position against the car sidewall, hook members are provided on the outer surface of the panel and on the car side wall. As shown, each hook member on a panel comprises an offset plate 45 fastened to the panel and extending outwardly and downwardly from the outer surface thereof. An offset strap 46 is secured to the car side wall and is spaced outwardly therefrom at its central portion to receive the lower offset end of the plate 45 in the manner shown in FIGS. 7 and 8. These cooperating hook members will hold the side filler unit closely against the adjacent car side wall in the stored position and retain the same from shifting longitudinally of the car, but are not required to carry the weight of the side filler since its lower edge may rest on the car floor. They do, however, hold the side filler unit sufficiently close to the car side wall so that lading separating doors in the car operating on the track 14 may be utilized in their normal manner without interference from the side filler units. The hook members may easily be engaged by observing them through the sighting openings 25a.

The side filler may be extended in the construction shown to three different operative positions spaced different distances from the car side wall. For moving a side filler from its stored to one of its operative positions, the operator may first release the two floor latches by raising the latch pins 41 and may lift the panel to disengage the hook members 45 and 46. He may then swing the lower edge of the panel outward from the car side wall to move the hooks 36 out from beneath the track. He may then reach through the hand holes 24 and swing the reinforcing strips 26 to their extended positions and then move the latch plate 28 down to its latching position, as shown in FIGS. 2 to 4. For placing the side filler in its position closest to the side wall the operator may then tip the panel backward and position the hooks 36 in the space between the car side wall and track backing strip 15, as shown at the right of FIG. 6. In this position, the free edges of the reinforcing strips 26 will engage the adjacent side wall of the car and the latching pins 41 at the bottom of the panel may be pressed down into the appropriate openings in the floor of the car. The front sections of the shoulders 37 extend beneath the backing strip 15 to prevent upward bounce of the panel. In this position, the side filler, as shown in the position second from the right in FIG. 1, is spaced outwardly from the car side wall a predetermined distance fixed by the width of the reinforcing strips 26 and positioning of the latching openings 44.

For positioning the side filler still further into the car, the hooks 36 may be inserted through the latching openings 18 of the track structure, as shown in the intermediate position in FIG. 6. By tilting the panel and observing the position of the hooks through the sighting openings 25, the operator may easily position the hooks in the latching openings and may complete the setting of the side filler by pressing the latching pins at the bottom of the panel into the appropriate floor openings 44. In this position the shoulders 37 will underlie the track to limit upward movement of the panel.

For a still further narrowing of the car loading space the operator may engage the hooks over the track flange 19 or over the edge of the track with their tips extending through the latching openings in the case of a track without a flange, as shown in the position at the left of FIG. 6. It will be noted that in this position, the outer sections of the shoulders 37 on the plate 35 extends under the inner edge of the track structure so that the side filler must be tilted in order to raise it. With the bottom of the panel latched by engagement of the latching pins 41 in the appropriate innermost latching openings 44 the panel will be held in a vertical position in which it cannot bounce upwardly accidentally to release the hook 36 from the track flanges or the latching pins from their openings.

It will be seen that the side filler structure of the present invention is an extremely simple and inexpensive one and is one which can easily be installed in any desired adjusted position in a car by a single operator both easily and quickly.

While one embodiment of the invention has been shown and described herein, it will be understood that it is illustrative only and not to be taken as a definition of the scope of the invention, reference being had for this purpose to the appended claims.

What is claimed is:

1. A side filler for a railway car having spaced side walls, a roof and a floor comprising a track mounted in the car adjacent to the juncture of a side wall and the roof and spaced from the side wall to leave a space adjacent to the side wall of the car and including a horizontal strip formed with a series of longitudinally spaced latching openings spaced inward from said space, and a straight upwardly facing edge portion at the inner edge of the track, a panel extending substantially from the floor to the roof of the car, a plurality of vertical reinforcing strips hinged to the outer surface of the panel to fold from a storage position flat against the panel to an extended position projecting outward from the panel, latch means on the panel to hold the reinforcing strips in their extended position, upwardly extending members at the upper ends of the reinforcing strips to fit into said space or into said latching openings selectively to hold the upper end of the panel spaced different distances from the adjacent side wall, and cooperating latch means on the lower end of the panel and the floor of the car selectively to latch the lower end of the panel at different distances from the adjacent side wall.

2. The side wall filler of claim 1 in which said members are downwardly opening hooks to hook over the edge portion of the track to hold the panel at a still different distance from the adjacent side wall.

3. The side wall filler of claim 2 in which the hooks include outwardly projecting shoulder portions beneath the hook openings which engage beneath the track to prevent the panel from rising.

4. A side filled for a railway car having spaced side walls, a roof and a floor comprising a track mounted in the car adjacent to the juncture of a side wall and the roof spaced from the side wall to leave a space adjacent to the side wall of the car and including a horizontal strip formed with a series of longitudinally spaced latching openings spaced inward from said space, and a straight upwardly facing edge portion at the inner edge of the track, a panel extending substantially from the floor to the roof of the car, a plurality of vertical reinforcing strips hinged to the outer surface of the panel to fold from a storage position flat against the panel to an extended position projecting outward from the panel, latch means on the panel to hold the reinforcing strips in their extended positions, hook members secured to the tops of the reinforcing strips adjacent to their free edges including flat plates secured face to face to the reinforcing strips and projecting above the tops thereof and downwardly opening hooks secured to and projecting above the plates with portions of the plates beneath the hook openings, the hooks being adapted to fit selectively into said space or said latching openings or to hook over said edge portion with said portions of the plates lying beneath the track and means to latch the lower edge of the panel to the car floor at different distances from the side wall.

5. A side filler for a railway car having spaced side walls, a roof and a floor comprising a track mounted in the car adjacent to the juncture of a side wall and the roof and spaced from the side wall to leave a space adjacent to the side wall of the car and including a horizontal strip formed with a series of longitudinally spaced latching openings spaced inward from said space, and a straight upwardly facing edge portion at the inner edge of the track, a panel extending substantially from the floor to the roof of the car, a plurality of vertical reinforcing strips hinged to the outer surface of the panel to fold from a storage position flat against the panel to an extended position projecting outward from the panel, latch means on the panel to hold the reinforcing strips in their extended position, upwardly projecting members at the tops of the reinforcing strips to fit into said space or into the latching openings selectively to hold the panel spaced different distances from the adjacent side wall when the reinforcing strips are extended, and cooperating latch means on the lower end of the panel and the floor of the car selectively to latch the lower end of the panel at different distances from the adjacent side wall, a downwardly opening hook on the outer surface of the panel, and a complementary vertically opening socket member on the adjacent side wall to hold the panel and reinforcing strips closely against the side wall when the reinforcing strips are in their storage position.

6. A side filler for a railway car having spaced side walls, a roof and a floor comprising a track mounted in the car adjacent to the juncture of a side wall and the roof and spaced from the side wall to leave a space adjacent to the side wall of the car and including a horizontal strip formed with a series of longitudinally spaced latching openings spaced inward from said space, and a straight upwardly facing edge portion at the inner edge of the track, a panel extending substantially from the floor to the roof of the car, a plurality of vertical reinforcing strips hinged to the outer surface of the panel to fold from a storage position flat against the panel to an extended position projecting outward from the panel, latch means on the panel to hold the reinforcing strips in their extended position, upwardly projecting members at the tops of the reinforcing strips to fit into said space or into the latching openings selectively to hold the panel spaced different distances from the adjacent side wall when the reinforcing strips are extended, the floor of the car being formed with a series of latching openings spaced different distances from said adjacent side wall, vertically extending guide sleeves at the lower edge of the panel, latch pins slidable in the sleeves and adapted to engage selectively in the latching openings, and a spring detent carried by each of the latching pins and frictionally engaging the corresponding sleeve and tending to hold the pin in any position in which it is placed.

7. A side filler for a railway car having spaced side walls, a roof and a floor comprising a track mounted in the car adjacent to the juncture of a side wall and the roof and spaced from the side wall to leave a space adjacent to the side wall of the car and including a horizontal strip formed with a series of longitudinally spaced latching openings spaced inward from said part, and a straight upwardly facing edge portion at the inner edge of the track, a panel extending substantially from the floor to the roof of the car, a plurality of vertical reinforcing strips hinged to the outer surface of the panel to fold from a storage position flat against the panel to an extended position projecting outward from the panel, the reinforcing strips being formed with shaped openings therein adjacent to the panel, a latch plate hinged to the outer surface of the panel to swing from a raised stored position flat against the panel to a latching position projecting outward from the panel, the latch plate having notches in its edges to receive edge portions of the reinforcing strips adjacent the openings therein when the reinforcing strips are in their extended position and the latch plate is in its latching position, end portions of the latching strip lying in said openings when the reinforcing strips and latching strips are in their storage positions, and hook members on the top of the reinforcing strips to engage the latching openings and the upwardly facing edge portion of the track at different positions to hold the panel spaced different distances from the adjacent side wall, and cooperating latch means on the lower end of the panel and the floor of the car selectively to latch the lower end of the panel at different distances from the adjacent side wall.

8. The side filler of claim 7 including magnetic means to hold the latch plate in its raised stored position and in which the panel is formed with hand holes through which the reinforcing strips and the latch plate can be moved.

9. A side filler for use in railway cars and the like comprising a flat panel, a plurality of reinforcing strips hinged to one side of the panel and extending lengthwise thereof, the reinforcing strips being swingable from a storage position flat against the panel to an extended position projecting outwardly from the panel, upwardly projecting members carried by and projecting beyond the tops of the reinforcing strips and adapted to engage retaining parts at the top of a car, latch members carried by the lower part of the panel and adapted to engage latch parts at the floor of the car, and latch means carried by the panel and engageable with the reinforcing strips to hold them in their extended position.

10. A side filler for use in railway cars and the like comprising a flat panel, a plurality of reinforcing strips hinged to one side of the panel and extending lengthwise thereof, the reinforcing strips being swingable from a storage position flat against the panel to an extended position projecting outward from the panel, upwardly projecting members carried by and projecting beyond the tops of the reinforcing strips and adapted to engage retaining parts at the top of a car, latch members carried by the lower part of the panel and adapted to engage latch parts at the floor of the car, and a latch plate hinged to said one side of the panel on an axis transverse to the hinge axes of the reinforcing strips to swing from a raised storage position flat against the panel to an outwardly projecting latching position, the reinforcing strips having openings therein in which the latch plate can swing and the latch plate having notches at its edges to receive edge portions of the reinforcing strips adjacent to the openings.

11. The side filler of claim 10 in which the panel is formed with hand holes through which the reinforcing strips and latch plates can be manipulated.

12. The side filler of claim 10 in which the panel is formed with sight openings through which positioning of the retaining parts can be observed.

13. A side filler for use in railway cars and the like comprising a flat panel, a plurality of reinforcing strips hinged to one side of the panel and extending lengthwise thereof, the reinforcing strips being swingable from a storage position flat against the panel to an extended position projecting outwardly from the panel, upwardly projecting members carried by and projecting beyond the tops of the reinforcing strips and adapted to engage retaining parts at the top of a car, latch members at the lower part of and operatively connected to the panel and adapted to engage latch parts at the floor of the car, and latch means carried by the panel and engageable with the reinforcing strips to hold them in their extended position.

References Cited
UNITED STATES PATENTS

| | | | |
|---|---|---|---|
| 1,963,545 | 6/1934 | Campbell et al. | 105—369 |
| 2,819,810 | 1/1958 | DeWitt | 105—369 |
| 2,885,221 | 5/1959 | Weeks | 105—369 |

DRAYTON E. HOFFMAN, *Primary Examiner.*

LEO QUACKENBUSH, ARTHUR L. LA POINT,
*Examiners.*